United States Patent
Junuzovic et al.

(10) Patent No.: US 11,190,741 B2
(45) Date of Patent: Nov. 30, 2021

(54) REAL-TIME MAPPING OF PROJECTIONS ONTO MOVING 3D OBJECTS

(71) Applicant: Microsoft Technology Licensing, LLC, Redmond, WA (US)

(72) Inventors: Sasa Junuzovic, Kirkland, WA (US); William Thomas Blank, Bellevue, WA (US); Steven Bathiche, Kirkland, WA (US); Anoop Gupta, Woodinville, WA (US); Andrew D. Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 15/934,881

(22) Filed: Mar. 23, 2018

(65) Prior Publication Data

US 2018/0213195 A1 Jul. 26, 2018

Related U.S. Application Data

(63) Continuation of application No. 14/571,266, filed on Dec. 15, 2014, now Pat. No. 9,961,315, and a (Continued)

(51) Int. Cl.
*H04N 9/31* (2006.01)
*H04N 13/207* (2018.01)
(Continued)

(52) U.S. Cl.
CPC ........... *H04N 9/3179* (2013.01); *G03B 15/05* (2013.01); *G03B 17/54* (2013.01); *G06F 3/00* (2013.01);
(Continued)

(58) Field of Classification Search
CPC .... G03B 15/05; G03B 17/54; G03B 2215/05; G06F 3/00; G06F 3/0425; G06F 3/0426;
(Continued)

(56) References Cited

U.S. PATENT DOCUMENTS

| | | | |
|---|---|---|---|
| 2002/0063711 A1* | 5/2002 | Park | H04N 5/232 345/428 |
| 2004/0090524 A1* | 5/2004 | Belliveau | H05B 47/18 348/102 |

(Continued)

*Primary Examiner* — Md N Haque
(74) *Attorney, Agent, or Firm* — Alleman Hall Creasman & Tuttle LLP (57) ABSTRACT

A "Concurrent Projector-Camera" uses an image projection device in combination with one or more cameras to enable various techniques that provide visually flicker-free projection of images or video, while real-time image or video capture is occurring in that same space. The Concurrent Projector-Camera provides this projection in a manner that eliminates video feedback into the real-time image or video capture. More specifically, the Concurrent Projector-Camera dynamically synchronizes a combination of projector lighting (or light-control points) on-state temporal compression in combination with on-state temporal shifting during each image frame projection to open a "capture time slot" for image capture during which no image is being projected. This capture time slot represents a tradeoff between image capture time and decreased brightness of the projected image. Examples of image projection devices include LED-LCD based projection devices, DLP-based projection devices using LED or laser illumination in combination with micromirror arrays, etc.

20 Claims, 6 Drawing Sheets

Related U.S. Application Data continuation of application No. 13/160,080, filed on Jun. 14, 2011, now Pat. No. 8,928,735.

(51) Int. Cl.

| | |
|---|---|
| *H04N 13/254* | (2018.01) |
| *H04N 13/271* | (2018.01) |
| *G06F 3/042* | (2006.01) |
| *G03B 15/05* | (2021.01) |
| *H04N 5/225* | (2006.01) |
| *H04N 5/247* | (2006.01) |
| *H04N 7/14* | (2006.01) |
| *G03B 17/54* | (2021.01) |
| *G06F 3/00* | (2006.01) |
| *H04L 12/18* | (2006.01) |
| *H04N 5/33* | (2006.01) |

(52) U.S. Cl.
CPC .......... *G06F 3/0425* (2013.01); *G06F 3/0426* (2013.01); *H04L 12/1813* (2013.01); *H04N 5/2256* (2013.01); *H04N 5/247* (2013.01); *H04N 7/141* (2013.01); *H04N 9/3194* (2013.01); *H04N 13/207* (2018.05); *H04N 13/254* (2018.05); *H04N 13/271* (2018.05); *G03B 2215/05* (2013.01); *H04N 5/33* (2013.01)

(58) Field of Classification Search
CPC ............ H04L 12/1813; H04N 13/0207; H04N 13/0253; H04N 13/0271; H04N 5/2256; H04N 5/247; H04N 5/33; H04N 7/141; H04N 9/3179; H04N 9/3194
See application file for complete search history.

(56) References Cited

U.S. PATENT DOCUMENTS

| | | | | |
|---|---|---|---|---|
| 2010/0118025 | A1* | 5/2010 | Smith | G06Q 30/02 345/418 |
| 2010/0188478 | A1* | 7/2010 | Robinson | H04N 7/15 348/14.16 |
| 2011/0007217 | A1* | 1/2011 | Huang | H04N 1/00347 348/554 |
| 2011/0197147 | A1* | 8/2011 | Fai | G06F 3/017 715/753 |

* cited by examiner

REAL-TIME MAPPING OF PROJECTIONS ONTO MOVING 3D OBJECTS

CROSS-REFERENCE TO RELATED APPLICATIONS

This application is a Continuation of U.S. patent application Ser. No. 13/160,080, now U.S. Pat. No. 8,928,735, filed on Jun. 14, 2011, and entitled "COMBINED LIGHTING, PROJECTION, AND IMAGE CAPTURE WITHOUT VIDEO FEEDBACK." In addition, this application is a Continuation of U.S. Pat. application Ser. No. 14/571,266, filed on Dec. 15, 2014, and entitled "INTRA-FRAME CONTROL OF PROJECTOR ON-OFF STATES."

BACKGROUND

Technical Field

A "Concurrent Projector-Camera" uses an image projection device in combination with one or more digital cameras and optional lighting to enable various techniques that provide visually flicker-free projection concurrently with real-time image or video capture in the same space in a manner that eliminates video feedback from the projection into the real-time image or video capture.

Background Art

If two or more people are trying to share a common desktop where each has a camera and a projector, a video feedback loop will be created causing the video to become useless in a manner similar to audio feedback which results in high pitch squealing. This problem has been referred to as "visual echo."

More specifically, "visual echo" represents the appearance of the projected contents viewed by a camera back into the projection over time. This problem is analogous to audio or acoustic echo in telephone communications where the person speaking hears a delayed version of his own voice that may become increasingly corrupted by ongoing echo over time. As with acoustic echo cancellation, visual echo cancellation has been performed using a variety of techniques, some of which require significant computational resources.

For example, one conventional visual echo cancellation scheme for sharing a virtual workspace or virtual whiteboard between separate locations uses a setup in which the captured video at each location contains local writings or user gestures (i.e., the "foreground") along with projected contents representing the shared workspace. Therefore, if the captured video is simply broadcast to each separate location, there will be a feedback loop that will distort the projected image. In fact, after only a few frames, some parts of the projected image will become saturated while some parts of the real (i.e., local) writing will appear to have a ghosting effect. This problem is addressed by using an off-line calibration procedure that records a geometric and photometric transfer between the projector and the camera in a look-up table. Then, during run-time, projected contents in the captured video are identified using the calibration information and computationally suppressed, therefore achieving the goal of canceling visual echo.

Another conventional approach to visual echo cancellation synchronizes a fast switching DLP projector and a camera, so that the camera takes an image only when the projector is off or showing a specific pattern. This effectively interleaves the operation of the projector and camera in a time-sequential manner using default projector timings. The use of a fast-switching DLP projector avoids visual flicking. While this approach avoids visual echoes by interleaving projection and image capture operations, it requires careful analysis of the DLP projector color wheel and mirror flip timing for synchronizing camera activation timing in a manner that ensures that images are only captured when the DLP projector is either off or is projecting a known pattern. It has been suggested that such systems are difficult to implement and to accurately synchronize. A related approach simply prevented one or more entire frames from being projected to provide a time during which images could be captured by a co-located camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Concurrent Projector-Camera," as described herein, uses an image projection device in combination with one or more digital cameras to enable various techniques that provide visually flicker-free projection of recorded or real-time images or video, while real-time image or video capture is occurring in approximately that same space (which includes a sub-region of the projection area, the entire projection area or extended region encompassing the projection area). Note that rather than repeatedly describing the range of areas in which the camera or cameras are capturing the scene or projection space, the following discussion will generally simply refer to using the camera or cameras to capture the projection area. Further, the Concurrent Projector-Camera provides these capabilities in a manner that eliminates video feedback from the projection into the real-time image or video capture. Note that this process differs from conventional techniques that attempt to interleave image capture and image projection without dynamically modifying projector timing. Examples of image projection devices that may be adapted for use by the Concurrent Projector-Camera include, but are not limited to, LED-LCD based projection devices, DLP-based projection devices using LED or laser illumination in combination with micromirror arrays or LCD shutters, etc.

More specifically, the Concurrent Projector-Camera dynamically synchronizes a combination of projector lighting on-state temporal compression in combination with on-state temporal shifting to open an intra-frame "capture time slot" for image capture during which no image is being projected. This capture time slot is created during the period in which a single image frame is being projected (hence the use of the term "intra-frame"), and represents a tradeoff between image capture time and decreased brightness of the projected image frame. Significantly, these capabilities are achieved without cancelling or eliminating entire projection frames, as is the case with various conventional techniques.

In other words, the Concurrent Projector-Camera dynamically controls an image projection device to create a capture time slot, during which no image is being projected. Therefore, this capture time slot allows images to be captured of the projection area without being corrupted by the projection. Further, the image capture enabled by the Concurrent Projector-Camera can be achieved at a frame rate at least as high as the frame rate of the projector, thereby enabling a wide variety of applications involving real-time multi-site video communications. Advantageously, all of these real-time multi-site video communications applications are achieved while completely eliminating any possibility of "visual echo" from any projection into any captured image that is then transmitted or broadcast to another location.

For example, in the case of LED-LCD based projectors, the Concurrent Projector-Camera creates the capture time slot by dynamically reducing or compressing the amount of time during which each LED is in an on-state during each image frame, as well as shifting those compressed LED on-state times within the time period for each image frame projection. This synchronized combination of LED on-state temporal compression and LED on-state temporal shifting opens a window of time (i.e., the aforementioned "capture time slot") during which an image can be captured by a camera without being corrupted by the projection.

Advantageously, when using small projectors (e.g., pico-projectors) in combination with relatively small cameras, the Concurrent Projector-Camera can be implemented within a small form factor about the size and configuration of a small desktop lamp. In fact, such a form factor can include optional additional lighting that allows the Concurrent Projector-Camera to function as a lamp when not being used for other purposes such as providing scene illumination for the camera. For example, desktop lamps come in many configurations that can either be set onto a desktop surface to provide illumination of that surface, or can be clamped or attached to an edge of a desktop surface or other nearby object or wall. The Concurrent Projector-Camera can also be implemented within other lighting-type fixtures or even attached or hung from a ceiling (in a recessed or pendant-light type format), either with or without lighting capabilities to enable the functionality described above. Therefore, by implementing the Concurrent Projector-Camera within any of these types of form factors, the Concurrent Projector-Camera enables implementations such as projections onto a table surface (or any other surface or area) wherein multiple parties at remote locations can interact with that projection without causing "visual echo" in the projection provided to any of the separate locations.

In view of the above summary, it is clear that the Concurrent Projector-Camera described herein provides robust flicker-free visual echo cancellation in separate shared or concurrent spaces in which both image capture and projections are being concurrently maintained over any desired period of time. In addition to the just described benefits, other advantages of the Concurrent Projector-Camera will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

A "Concurrent Projector-Camera," as described herein, uses an image projection device in combination with one or more cameras to enable various techniques that provide visually flicker-free projection of recorded or real-time images or video within a region or onto a surface, while real-time image or video capture is occurring in approximately that same space (which includes a sub-region of the projection area, the entire projection area or extended region encompassing the projection area). Note that rather than repeatedly describing the range of areas in which the camera or cameras are capturing the scene or projection space, the following discussion will generally simply refer to using the camera or cameras to capture "the projection area" or "approximately the same area" as the projection. Further, the Concurrent Projector-Camera provides these capabilities in a manner that eliminates video feedback (also referred to as "visual echo") from the projection into the real-time image or video capture. Examples of solid-state projection devices adaptable for use by the Concurrent Projector-Camera include, but are not limited to, LED-LCD based projection devices, DLP-based projection devices using LED or laser illumination in combination with micromirror arrays, etc.

More specifically, the Concurrent Projector-Camera dynamically synchronizes a combination of projector solid-state lighting on-state temporal compression in combination with on-state temporal shifting to open an intra-frame "capture time slot" for image capture during which no image is being projected. This capture time slot is created during the period in which a single image frame is being projected, and represents a tradeoff between image capture time and decreased brightness of the projected image frame. Significantly, these capabilities are achieved without cancelling or eliminating entire projection frames, as is the case with various conventional techniques.

Further, in various embodiments, the total duration of the time slot can be adjusted by first determining appropriate camera exposure times for local lighting conditions to determine a minimum acceptable window during which image capture can occur. In such embodiments, the Concurrent Projector-Camera uses conventional camera light metering technologies to determine local ambient lighting conditions for determining proper exposure times for the camera. The capture time slot is then opened for only enough time within the time for each frame to allow image capture.

However, as discussed in further detail below, in various embodiments, the Concurrent Projector-Camera either uses light from the projector to illuminate the scene for image capture, or a dedicated light or flash type device is used to illuminate the scene for image capture during the capture time slot. In such cases, the capture time slot can generally be shortened, as increased local light will allow for shorter image capture times, as is well known to those skilled in the art.

In either case, whether determining a minimum acceptable window or providing illumination for shortening that window, these types of embodiments ensure that the Concurrent Projector-Camera does not open the capture time slot for periods longer than necessary, thereby limiting the projector brightness losses resulting from opening the capture time slot within the time for each projected image frame.

Figure 1:
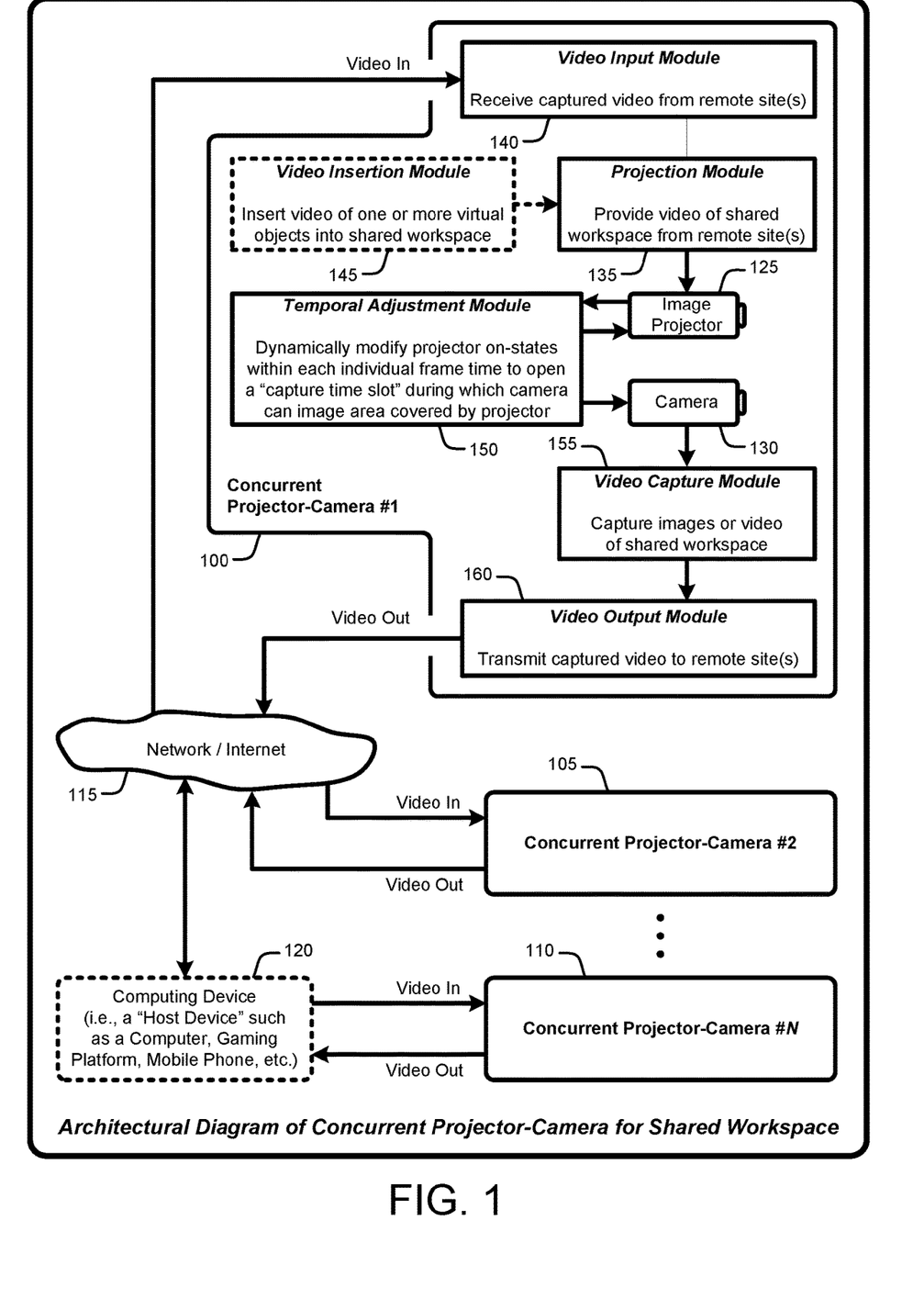
FIG. 1 provides an exemplary architectural flow diagram that illustrates program modules and hardware for implementing various embodiments of the Concurrent Projector-Camera, as described herein.

1.1 System Overview:

As noted above, the "Concurrent Projector-Camera" provides robust flicker-free visual echo cancellation in separate shared or concurrent spaces in which both image capture and projections are being concurrently maintained over any desired period of time. The processes summarized above are illustrated by the general system diagram of FIG. 1. In particular, the system diagram of FIG. 1 illustrates the interrelationships between program modules for implementing various embodiments of the Concurrent Projector-Camera, as described herein. Furthermore, while the system diagram of FIG. 1 illustrates a high-level view of various embodiments of the Concurrent Projector-Camera, FIG. 1 is not intended to provide an exhaustive or complete illustration of every possible embodiment of the Concurrent Projector-Camera as described throughout this document.

In addition, it should be noted that any boxes and interconnections between boxes that may be represented by broken or dashed lines in FIG. 1 represent alternate embodiments of the Concurrent Projector-Camera described herein, and that any or all of these alternate embodiments, as described below, may be used in combination with other alternate embodiments that are described throughout this document.

Two or more Concurrent Projector-Cameras are intended to work in cooperation to enable various shared workspace scenarios (e.g., one Concurrent Projector-Camera at each remote location sharing a workspace). Consequently, FIG. 1 illustrates several Concurrent Projector-Cameras 100, 105 and 110 in communication via a network/internet 115 with an optional computing device 120 (also referred to herein as a "host device") acting as an intermediary between one or more of the Concurrent Projector-Cameras, and potentially performing additional computations for the Concurrent Projector-Cameras. Each Concurrent Projector-Camera 100, 105 and 110 generally include similar elements, although there are several alternate embodiments of the Concurrent Projector-Cameras that are discussed in Section 2.4 such that there may be differences between individual Concurrent Projector-Cameras. However, for purposes of explanation, FIG. 1 shows Concurrent Projector-Camera #1 (100) with various modules and components, while illustrating Concurrent Projector-Camera #2 (105) and Concurrent Projector-Camera #N (110) as "black boxes" that are intended to provide at least the same minimum functionality as described below for Concurrent Projector-Camera #1 (100).

In general, the Concurrent Projector-Camera (100, 105 or 110) includes an image projector 125 and a camera 130. While size of these devices is not a defining feature of the Concurrent Projector-Camera (100, 105 or 110), it should be noted that a relatively small projector 125 (e.g., a solid-state pico-projector), can be combined with a relatively small camera 130 (e.g., a webcam or any other desired camera) for integration into a relatively small form factor about the size of a small desktop lamp that can be placed on or clamped to a table or other surface. Such form factors enable implementations such as projections onto a surface wherein multiple parties at remote locations can interact with that projection without causing "visual echo" in the projection provided to any of the separate locations.

Regardless of the form factor in which the projector 125 and camera 130 are combined, both the projector and camera are directed towards the same general space or area. In other words, the camera 130 is configured to capture images and/or video of the same general area where the projector 125 projects images and/or videos. The Concurrent Projector-Camera (100, 105 or 110) includes a projection module 135 that provides video of a shared workspace captured from one or more remote sites (using another Concurrent Projector-Camera) to the projector 125 for projection. Note also that in various embodiments, the Concurrent Projector-Camera (100, 105 or 110) includes an optional video insertion module 145 that inserts projections of one or more real or virtual objects into the projection of the shared workspace provided by the projection module 135.

For example, in the case that two people at remote sites are playing a shared game of chess, the Concurrent Projector-Camera (100, 105 or 110) at each site will project a virtual chessboard into the area of each remote site, while also projecting each person's interactions with that virtual chess board (captured by camera 130 via a video capture module 155) to the other remote site. In general a video output module 160 is used to transmit images and/or video captured by camera 130 to other remote sites via the internet/network 115. Further, a video input module 140 of each Concurrent Projector-Camera (100, 105 or 110) receives the video output from each other Concurrent Projector-Camera. Note that FIG. 2, discussed below in Section 2.1, provides a graphical example of this type of use of the Concurrent Projector-Camera (100, 105 or 110). Note that this type of multi-site shared workspace uses an automatic alignment of the projector and camera so that the camera at each site captures the appropriate portions of the scene for projection at each other site.

Figure 5:
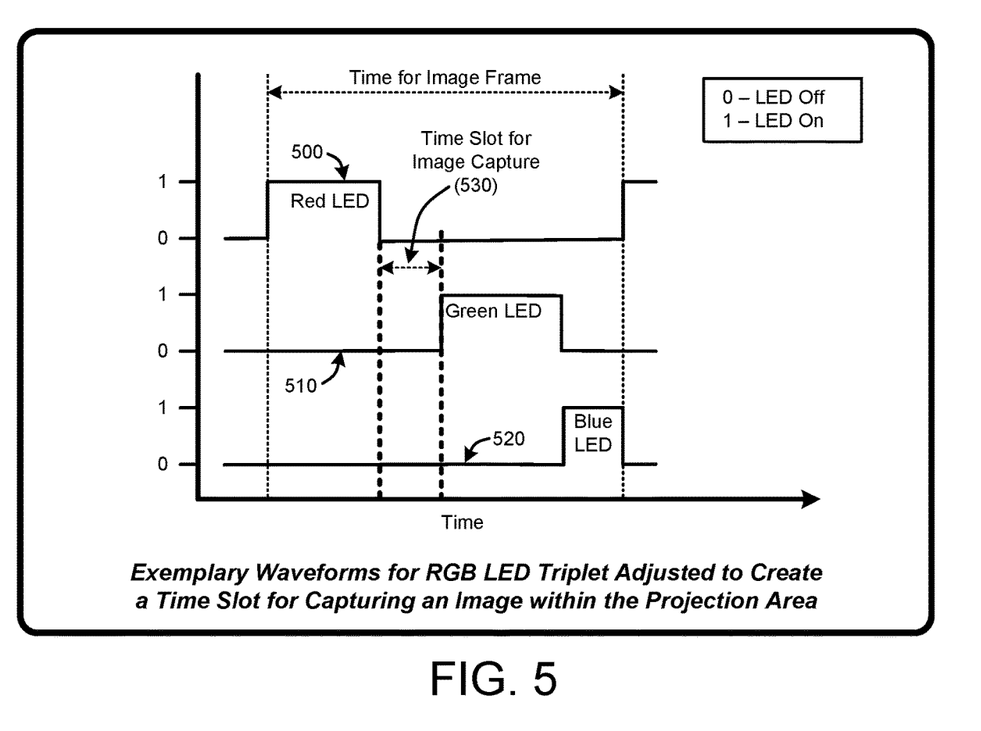
FIG. 5 illustrates exemplary waveforms for an RGB LED triplet that have been adjusted by the Concurrent Projector-Camera to create an intra-frame capture time slot for capturing an image within the projection area, as described herein.

As noted above, video capture by camera 130 occurs in a manner that prevents possible visual echo. More specifically the Concurrent Projector-Camera (100, 105 or 110) includes a temporal adjustment module 150 that dynamically modifies projector 125 on-states (see Section 2.3) within each individual frame time to open the aforementioned intra-frame "capture time slot". The connection from the image projector 125 to the temporal adjustment module 150 allows the temporal adjustment module to properly phase the capture time slot for image capture 530. Again, the camera 130 capture images and/or videos of the area covered by projector 125 during this capture time slot which itself is a subinterval of time opened within each individual projector 125 frame time. In particular, the modified projector 125 on-states ensure that the camera 130 captures images at times when the area or region being imaged is not also being subjected to a projection from the projector 125.

Note that in various embodiments, the concurrent projector camera (100, 105 or 110) also includes optional local audio capture capabilities (not shown) for capturing local audio for transmission to one or more remote sites along with the locally captured video. These audio capture capabilities may also include various acoustic echo cancellation techniques to enable various audio conferencing scenarios. Since such audio capture and acoustic echo cancellation techniques are well-known to those skilled in the art, they will not be described in detail herein.

2.0 Operational Details of the Concurrent Projector-Camera:

The above-described program modules are employed for implementing various embodiments of the Concurrent Projector-Camera. As summarized above, the Concurrent Projector-Camera provides robust flicker-free visual echo cancellation in separate shared or concurrent spaces in which both image capture and projections are being concurrently maintained over any desired period of time. The following sections provide a detailed discussion of the operation of various embodiments of the Concurrent Projector-Camera, and of exemplary methods for implementing the program modules described in Section 1 with respect to FIG. 1. In particular, the following sections provide examples and operational details of various embodiments of the Concurrent Projector-Camera, including: an operational overview of the Concurrent Projector-Camera with an exemplary two-site shared workspace usage scenario; a discussion of various types of solid-state projectors as they relate to usage with the Concurrent Projector-Camera; dynamic intra-frame control of projector on-off states for opening capture time slots during each projected frame time; and additional embodiments and considerations.

2.1 Operational Overview:

As noted above, the Concurrent Projector-Camera-based processes described herein provides robust flicker-free visual echo cancellation in separate shared or concurrent spaces in which both image capture and projections are being concurrently maintained over any desired period of time. In general, the shared work spaces enabled by the Concurrent Projector-Camera can be maintained for two or more remote sites.

A simple example of a multi-site video communication having two sites is a shared surface showing a virtual chessboard that is concurrently displayed to players at two remote locations. Alternately, a real chessboard can be included in the first of the two locations, with virtual chess pieces being projected onto both the real board, and onto a virtual copy of the chess board at the second location captured by the camera of the Concurrent Projector-Camera at the first location.

For purposes of explanation, assuming the use of a virtual chessboard and pieces in both locations, each player will see a projection of the chess set and the other players interaction with that projected chess set (captured by a local camera associated with each player) without any "visual echo" resulting from either players interaction with the projected chess set. A simple example of this type of use of the Concurrent Projector-Camera is illustrated by FIG. 2.

Figure 2:
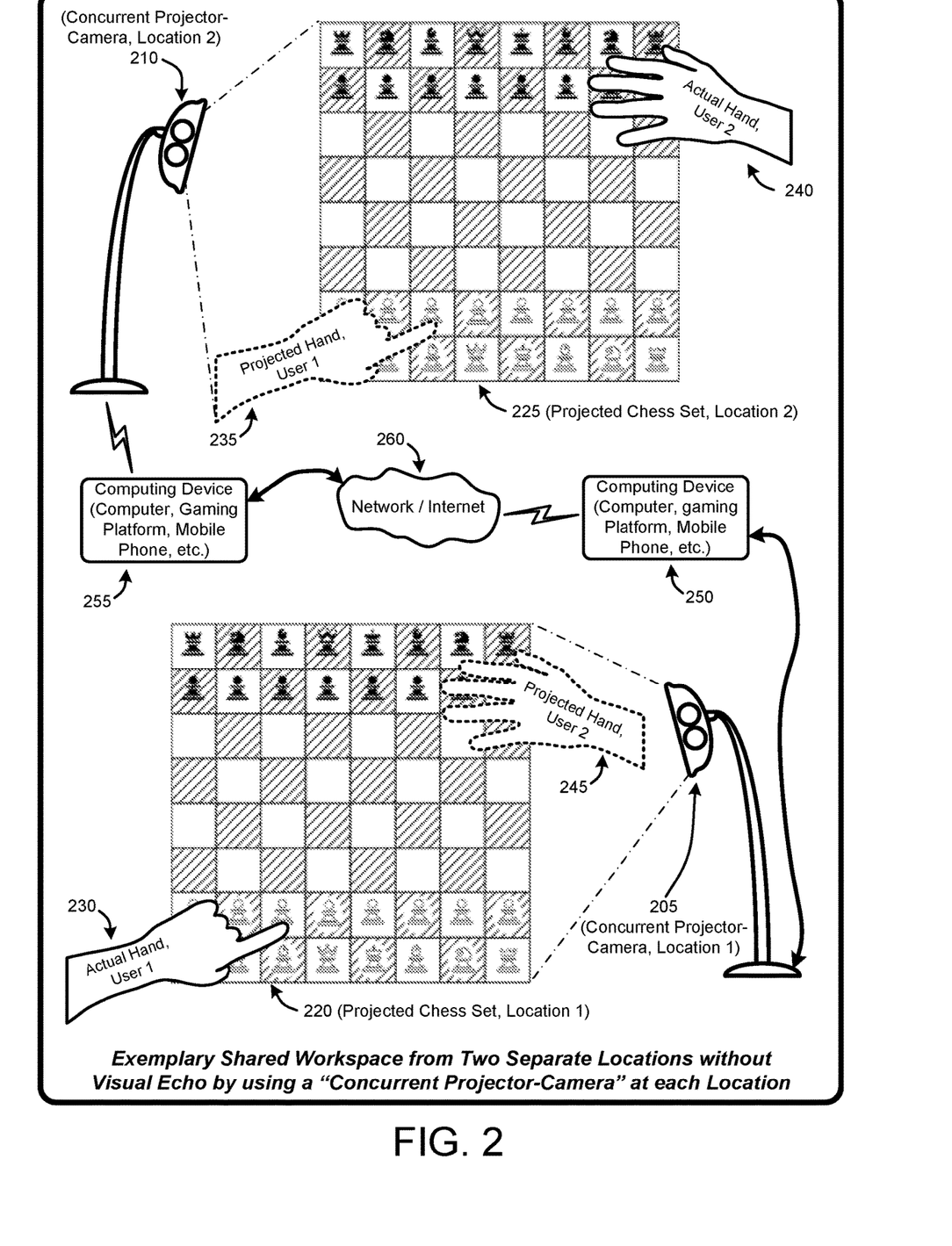
FIG. 2 illustrates an exemplary shared workspace from two separate locations without visual echo by using a "Concurrent Projector-Camera" at each Location, as described herein.

In particular, FIG. 2 shows two Concurrent Projector-Cameras (205 and 210) at separate locations (i.e., "location 1" and "location 2"). Each Concurrent Projector-Camera (205 and 210) is projecting a virtual copy of the same chess set (220 and 225, respectively) into the shared workspace in each of location 1 and location 2. However, in addition to the projected chess set (220 and 225) being projected into each workspace, the Concurrent Projector-Camera 210 in location 2 is also projecting a real-time video of a first user's hand 235 captured by the camera of the Concurrent Projector-Camera 205 from the first user's actual hand 230 as it interacts with the projected chess set 220 in location 1. Similarly, the Concurrent Projector-Camera 205 in location 1 is also projecting a real-time video of a second user's hand 245 captured by the camera of the Concurrent Projector-Camera 210 from the second user's actual hand 240 as it interacts with the projected chess set 220 in location 2.

In the example illustration of FIG. 2, each of the Concurrent Projector-Cameras (205 and 210) is in communication via a wired or wireless connection to an optional computing device (250 and 255, respectively), also referred to herein as a "host device," which in turn are in communication via the internet or other network 260. In general, when used, the optional host devices perform complex image and projection related computations to enhance the capabilities and control of each of the Concurrent Projector-Cameras (205 and 210). As summarized above with respect to FIG. 1, each Concurrent Projector-Camera (205 and 210) captures images of the projection area during intra-frame capture time slots and sends those images as a streaming video of the corresponding projection area to the other Concurrent Projector-Camera for local projection. Since the images and/or video captured by the camera of each of the Concurrent Projector-Cameras (205 and 210) is free from corruption by the ongoing projections in each of the two locations, each user simply sees a real-time projection of the chess set (220 or 225) along with both their own interaction and the other user's interaction with that shared projected chess set.

Note that this concept can be extended beyond two separate sites, as in the chess example described above, to many different sites that will allow many different users to interact with the same virtual workspace or projection without causing "visual echo" in the projection provided to any of the separate sites. A simple example of this extension is a virtual round-table meeting hosting multiple persons whose images are projected to each of the other meeting participants along with a projection of a project plan in 2D or 3D (e.g., an interactive 3D projection of a city model).

By providing a Concurrent Projector-Camera at each of the separate sites, the meeting participants will be able to concurrently interact with the projection of the project plan without causing "visual echo" in the projection provided to any of the separate sites. Further, each meeting participant will be able to see the interactions of every other participant with the project plan in real-time as those participants interact with the project plan. Further, the inclusion of a conventional audio system at each of the remote sites will allow the meeting participants to talk at the same time without interfering with the operations of the Concurrent Projector-Cameras in any of the separate sites.

Finally, note that two cameras or a dedicated 3D camera can be used by the Concurrent Projector-Camera to capture 3D images or video of the projection area for real-time transmission or broadcast to other sites. However, since this type of 3D image capture does not require additional intra-frame capture time slots to be opened, the following discussion will generally focus on the general 2D image capture scenario. Thus, all 2D image capture implementations described herein are also applicable to the 3D case. Similarly, various embodiments of the Concurrent Projector-Camera can be equipped with various different types of cameras (e.g., standard 2D cameras, 3D cameras, dedicated color-specific cameras, infrared or IR cameras, etc.) for particular implementations or intended uses. Consequently, the following discussion should be understood to apply to all such cases.

2.2 Image Projectors:

Examples of image projection devices that may be adapted for use by the Concurrent Projector-Camera include, but are not limited to, LED-LCD based projection devices, DLP-based projection devices using LED or laser illumination in combination with micromirror arrays or LCD shutters, etc. In other words, virtually any image projector using either solid-state lighting sources e.g., LED or laser) or optically fast light control points (e.g., micromirror arrays or LCD shutters) may be adapted for use in implementing various embodiments of the Concurrent Projector-Camera. Since these types of projectors are well known to those skilled in the art, they will not be described in detail herein. However, various aspects of different types of image projectors are adapted or modified in order to implement various embodiments of the Concurrent Projector-Camera described herein. Consequently, various pertinent features of various types of image projectors are discussed below.

As is well known to those skilled in the art, in the case of color projections, for each individual image frame, many image projectors rapidly cycle through projections in RGB (or potentially any other desired color space) in a sequence that is fast enough to effectively "blend" sequential RGB projections into what the human observer perceives to be a single color. This rapid color cycling is generally achieved either by cycling solid-state light sources, or by using a rotating color wheel or the like to cycle through the colors.

Further, in the case of many solid-state projectors, the intensity or brightness of the perceived colors is typically modulated up and down by rapidly cycling the LEDs on and off at very high frequencies while using a consistent current level (which may be different for each of the different color LEDs) to avoid color spectrum changes for the individual LEDs. In other words, when an LED is rapidly cycled on and off at a frequency beyond human visual perception, increased LED on times will simply be perceived by the human observer as an increased brightness level, while increased LED off times will simply be perceived as a decreased brightness level.

Similar brightness control are achieved in other projectors using light control points by rapidly cycling the light control point to effectively blank or transmit light to the human observer from whatever light source is being used by the projector. For example, in DLP projectors that use micromirror arrays as a light control point where the light source (e.g., incandescent, LED, Laser, etc.) is often constantly on, each micromirror in the array switches on and off (i.e., moves to different angles) multiple times during each projected image frame to project a sequence of sub-fields that aggregate in the human perception to create a perceived brightness or intensity level for the pixel or pixels corresponding to each micromirror.

More specifically, in typical DLP projectors, the image is created by microscopically small mirrors laid out in a matrix on a semiconductor chip that is generally referred to as a Digital Micromirror Device (DMD). Each mirror represents one or more pixels in the projected image, with the total number and layout of mirrors corresponding to an x,y resolution of the projected image. These mirrors are then rapidly switched or repositioned to reflect light either through the projector lens or on to a heat sink or "light dump". Rapidly toggling the mirror between these two orientations (essentially toggling the perceived light on and off) produces gray-scales (thus producing an apparent brightness level for the observer) that are controlled by the ratio of on-time to off-time. There are various methods by which DLP projection systems, including those used by single-chip or three-chip DLP projectors, create a color image, including sequential illumination by different color light sources including LEDs or lasers, and/or the use of one or more color wheels, etc.

For example, in the case of a projector with a single DLP micromirror chip, colors are produced either by placing a rotating color wheel between a white lamp (incandescent, LED, laser, etc.) and the DLP micromirror chip or by using individual light sources (e.g., RGB LEDs or lasers) to produce the primary colors. Color wheels are generally divided into multiple sectors that typically include the primary colors, red, green, and blue, and in many cases secondary colors including cyan, magenta, yellow and white. The DLP micromirror chip is then synchronized with the rotating motion of the color wheel so that (in an RGB projector) the green component of the image is displayed on the micromirror chip when the green section of the color wheel is in front of the lamp. The same is true for the red, blue (and other color sections, if used). The colors are thus displayed sequentially at a sufficiently high frequency that the human observer sees a composite "full color" image. Typical DLP projectors often use color wheels that rotate at around ten revolutions per projected image frame, though older projectors may run as slow as one revolution per projected image frame.

For example, a typical commercial low-cost 60 Hz (16.67 ms) LED based projector using MEMS micromirrors has about five internal fields (i.e., sub-fields corresponding to each mirror switch) for each projected image frame. In other words, at full brightness levels, a 60 Hz (16.67 ms) LED based projector with five internal fields per frame will switch the mirrors at approximately 3.3 ms intervals (i.e., 5×3.3 ms 16.67 ms 60 Hz).

2.3 Dynamic Intra-Frame Control of Projector On-Off States:

Note that for purposes of explanation, the following discussion will generally refer to the use of LED projectors, or various other projectors using semiconductor light sources for projection. However, any type of image projection device having a relatively high refresh rate can be used to implement various embodiments of the Concurrent Projector-Camera described herein. Note that minimum projector refresh rates on the order of about 60 Hz (or about 120 Hz for stereo or 3D projections) will ensure flicker-free operation with respect to human visual processing of projected images using the Concurrent Projector-Camera. However, image projectors having lower refresh rates may also be used if some amount of perceptible flicker is acceptable for a particular application. Clearly, image projectors having higher refresh rates may also be used.

In view of the discussion provided in Section 2.2, it can be seen that one feature that all types of image projectors have in common is that intensity is generally controlled by either rapidly cycling an on-off state of a solid-state light source (e.g., LED or laser), or by rapidly cycling light control points (e.g., micromirrors or LCD shutters) in a manner that produces an effective cycling between projector on-states and projector off-states. Again, in view of the preceding discussion, it should be clear that intensity or brightness of the projection decreases in direct proportion to the total time that the projector is in an off-state.

In general, the projector off-states (actual, mirror-based, or LCD shutter based) represent a time during which no image is being projected on a particular surface or object (referred to herein simply as a "projection area" or simply an "area" for purposes of discussion). Consequently, if a camera captures an image of the same area covered by the projection during a projector off-state, that image will not be corrupted by the projection. As a result, there is no possibility of visual echo if that captured image is itself is then transmitted and projected onto another area from which the original projection originated via capture by a second camera.

Unfortunately, with typical solid-state projection devices, these off-states are generally so short in duration that most cameras have difficulty capturing enough light from the projection area to produce a quality image during a projector off-state. Therefore, to enable the use of relatively inexpensive cameras, the Concurrent Projector-Camera provides various techniques for dynamically adjusting projector on-states (at the cost of reduced perceived intensity or brightness) to increase the total intra-frame time during which the projector is in an off-state during each individual frame. This dynamic adjustment of projector on-states provides an extended period during the projection time for each frame in which image capture can occur in the same area as the projection without that image capture being corrupted by the projection.

As noted above, the Concurrent Projector-Camera uses well-known techniques associated with photography (e.g., conventional light meters) to determine an appropriate amount of time for image capture (i.e., camera exposure times) by whatever camera is being used by the Concurrent Projector-Camera. This amount of time is then used as a minimum window size when adjusting the on-off states of the image projector to open the aforementioned intra-frame capture time slot. Note that since the determination of camera exposure times for particular lighting conditions is well known to those skilled in the art, no further discussion of determining minimum window sizes for capturing images will be provided herein. Instead, the following discussion will focus on various methods for actually opening or creating the intra-frame capture time slots.

Further, in various embodiments of the Concurrent Projector-Camera, dynamic adjustment of projector on-states is synchronized with raster-scan type projection systems such that the camera captures sub-parts of the projection area between times when the raster scan projections are being projected onto any area being imaged by the camera. These image sub-parts are then combined using conventional techniques to construct an image of the entire area.

Specific discussion and examples of various types of image projection devices and how they are modified for use in implementing various embodiments of the Concurrent Projector-Camera are described below.

2.3.1 Exemplary LED Projector-Based Implementations:

As noted above, in the case of an RGB LED projector (or other semiconductor light source based projector), the color of each pixel in the projected image is constructed by cycling between a triplet of red, green and blue LEDs for each pixel at a rate that blends the light from each triplet of LEDs into a single color, as perceived by human visual processes. Further, also as noted above, perceived intensity or brightness of each pixel is controlled by cycling on-off states of each LED that blends those on-off states into a relative brightness level, as perceived by human visual processes.

Figure 3:
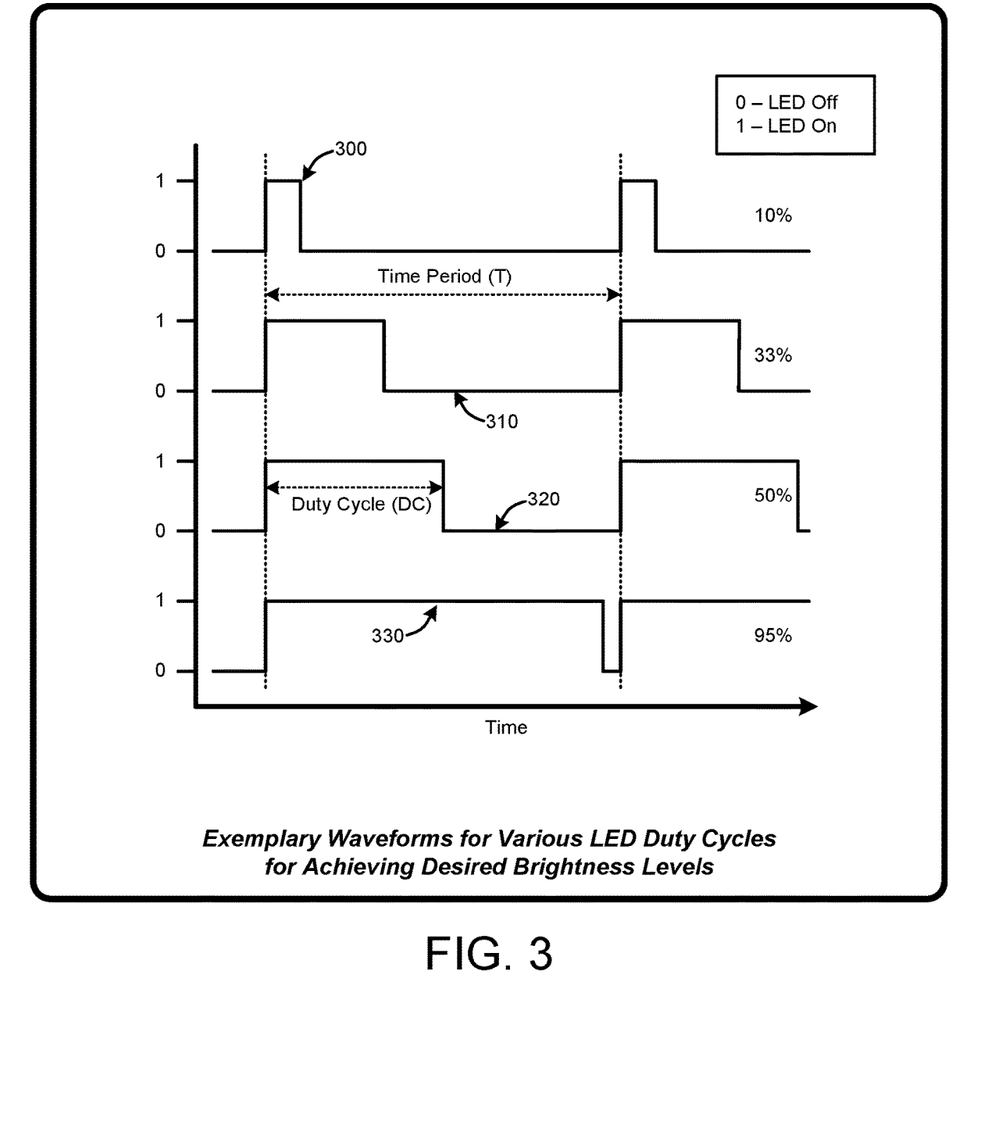
FIG. 3 illustrates exemplary conventional waveforms for various LED duty cycles for achieving desired brightness levels, as described herein.

For example, FIG. 3 illustrates exemplary conventional idealized waveforms (power vs. time) for controlling single LED on-off states to control perceived brightness levels. The exemplary waveforms (300, 310, 320, and 330) illustrated by FIG. 3 show LED duty cycles of 10%, 33%, 50% and 95%, respectively. In particular, a particular "duty cycle" (DC) over some time period (T) indicates the length of time during which power sufficient to cause the LED to emit light is provided to the LED. In general, for conventional LED-based projectors, the time period T is fixed, and while the duty cycle DC is varied to achieve the desired perceived brightness level for the LED. Note that there may be multiple time periods (T) for each image frame, depending upon the length of T and refresh rate or frequency of the projector.

Figure 4:
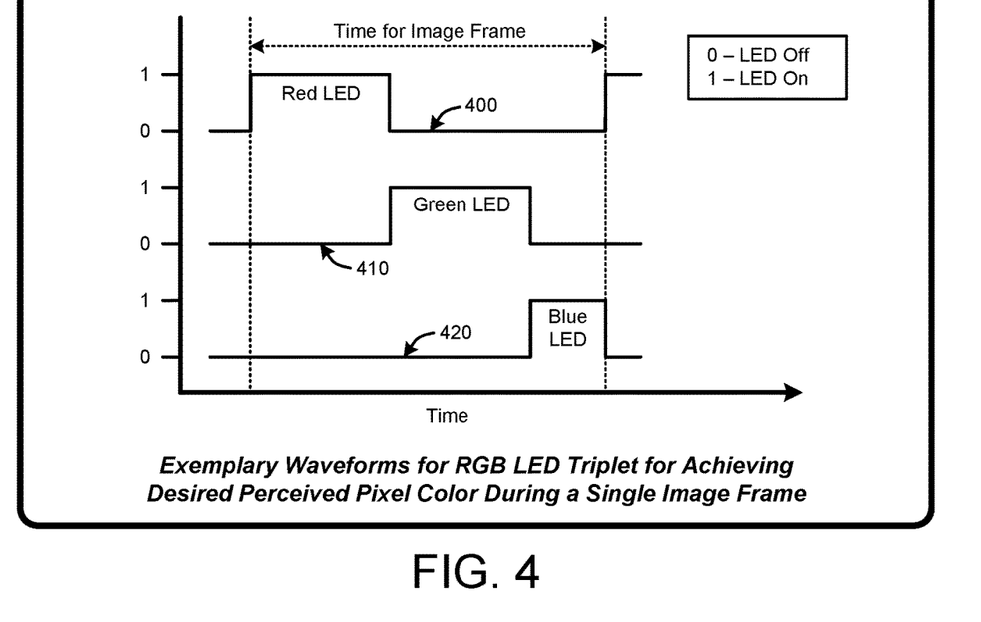
FIG. 4 illustrates exemplary conventional waveforms for an RGB LED triplet for achieving desired perceived pixel colors during a single image frame, as described herein.

FIG. 4 illustrates a slightly more complex set of conventional idealized "power waveforms" (power vs. time) for controlling LED on-off states to control perceived colors when using a set of three LEDs (e.g., in an RGB LED-based projector). For example, FIG. 4 illustrates a waveform for a red LED 400, a waveform for a green LED 410, and a blue LED 420. As illustrated, during the time period for an image frame to be projected, the projector will cycle between the red, green, and then blue LEDs to achieve the desired perceived color (note that blue LEDs tend to have shorter on times since they are often brighter than red or green LEDs). While FIG. 4 shows only one RGB cycle per image frame for purposes of explanation, there may be a number of such cycles within the time for projecting an image frame, depending upon the projector. In any case, it can be seen that there is little or no time during the projection of an image frame during which a camera can be used to capture an image frame that is not corrupted by a projection in one or more colors.

As illustrated by FIG. 5, the Concurrent Projector-Camera solves this problem by dynamically adjusting the amount of time during which each LED is in an on-state, as well as shifting those times within the time period for each image frame projection. This combination of on-state compression and temporal shifting opens an intra-frame window of time (referred to herein as a "capture time slot", or simply "time slot") during which an image can be captured by the camera of the Concurrent Projector-Camera without being corrupted by the projection of the Concurrent Projector-Camera.

For example, as illustrated by FIG. 5, the waveforms (500, 510 and 520) representing the on-state for each of the LEDs has been compressed by approximately 20% relative to the corresponding waveforms (400, 410 and 420, respectively) shown in FIG. 4. Further, as also illustrated by FIG. 5, the start of the on-states for both the green LED and the blue LED waveforms (510 and 520, respectively) have been shifted further out in time (i.e., shifted to the right) relative to the waveforms of FIG. 4 (410 and 420, respectively), with the compression of the red LED waveform 500 resulting in the red LED being in an off-state earlier in time. This combination of temporal compression and temporal shifting of the different LED on-states opens an intra-frame capture time slot 530 for image capture. Note that there is no requirement to adjust all of the LED on-state times (i.e., any one, any two, or all three LED waveforms can be compressed and/or shifted). Further, there is no requirement that the amount of adjustment for each LED on-state be the same. However, adjusting the different LEDs by different amounts may cause changes to the perceived color balance of the resulting projection. Depending upon the projector, these types of color shifts can be automatically corrected. Note that in the case that there are multiple RGB cycles within the time for projecting a particular image frame, one or more of those complete RGB cycles can be suppressed completely to provide the capture time slot for the camera. This concept is similar to the suppression of subfields in projectors using light control points, described below with respect to FIG. 6.

Returning to the example of a 60 Hz LED projector having 16.67 ms frame projection times (i.e., 1/60 Hz≈16.67 ms), a reduction or compression of the on-states of each LED by approximately 20% (as illustrated by FIG. 5), in combination with appropriate temporal shifting of when the LEDs are turned on will open the intra-frame capture time slot of about 3.3 ms in duration during which an image frame can be captured of the projection area by an appropriately positioned and synchronized camera. Note however, that in view of the preceding discussion, the temporal compression of the on-states of the LEDs by about 20% will result in a decrease in the perceived brightness of the projected image frame on the order of about 20%. In other words, as noted above, intra-frame image capture time slots are obtained as a tradeoff against projected frame brightness or intensity, with longer capture time slots corresponding to decreased perceived brightness levels.

2.3.2 Exemplary DLP Projector-Based Implementations:

As noted above, DLP based projectors typically use solid-state light control points (e.g., micromirrors or LCD shutters) that generally cycle on and off rapidly multiple times within each projected image frame to produce a sequence of subfields that aggregate in the human visual perception to create each perceived image frame. As noted above, these subfield cycles may by synchronized with color wheels, or there may be separate light control points for each independent color illumination source (e.g., three separate micromirror arrays for each of a red, green, and blue light source).

Regardless of the specific configuration of the DLP-based projector, in the case that such projectors use a sequence of subfield projections to create each image frame, various embodiments of the Concurrent Projector-Camera operate by dynamically suppressing one or more subfields within each image frame to open an intra-frame capture time slot for the camera. In related embodiments, the Concurrent Projector-Camera compresses the time during which each subfield is being projected, then temporally shifts one or more of the compressed subfields to open the capture time slot for the camera. Note also that both of these embodiments (as illustrated by FIG. 6, discussed below) can be combined to create a related embodiment wherein the intra-frame capture time slot is created by compressing and shifting one or more of the subfields while also suppressing one or more of the subfields (not illustrated by FIG. 6, as discussed below).

For example, a typical 60 Hz LED-based DLP projector using MEMS micromirrors has five internal fields (i.e., subfields corresponding to each mirror switch) for each projected image frame. In other words, at full brightness levels, a 60 Hz (16.67 ms) LED-based projector with five internal subfields per frame will switch the mirrors at approximately 3.3 ms intervals (i.e., 5×3.3 ms≈16.67 ms 60 Hz). In various embodiments, the Concurrent Projector-Camera will modify the projector operation in such cases to suppress (and/or compress and shift) one or more of the subfields, thereby creating the intra-frame capture time slot during which no projection is occurring so that the camera of the Concurrent Projector-Camera can capture image frames without corruption by the projector. This scenario is illustrated by FIG. 6.

Figure 6:
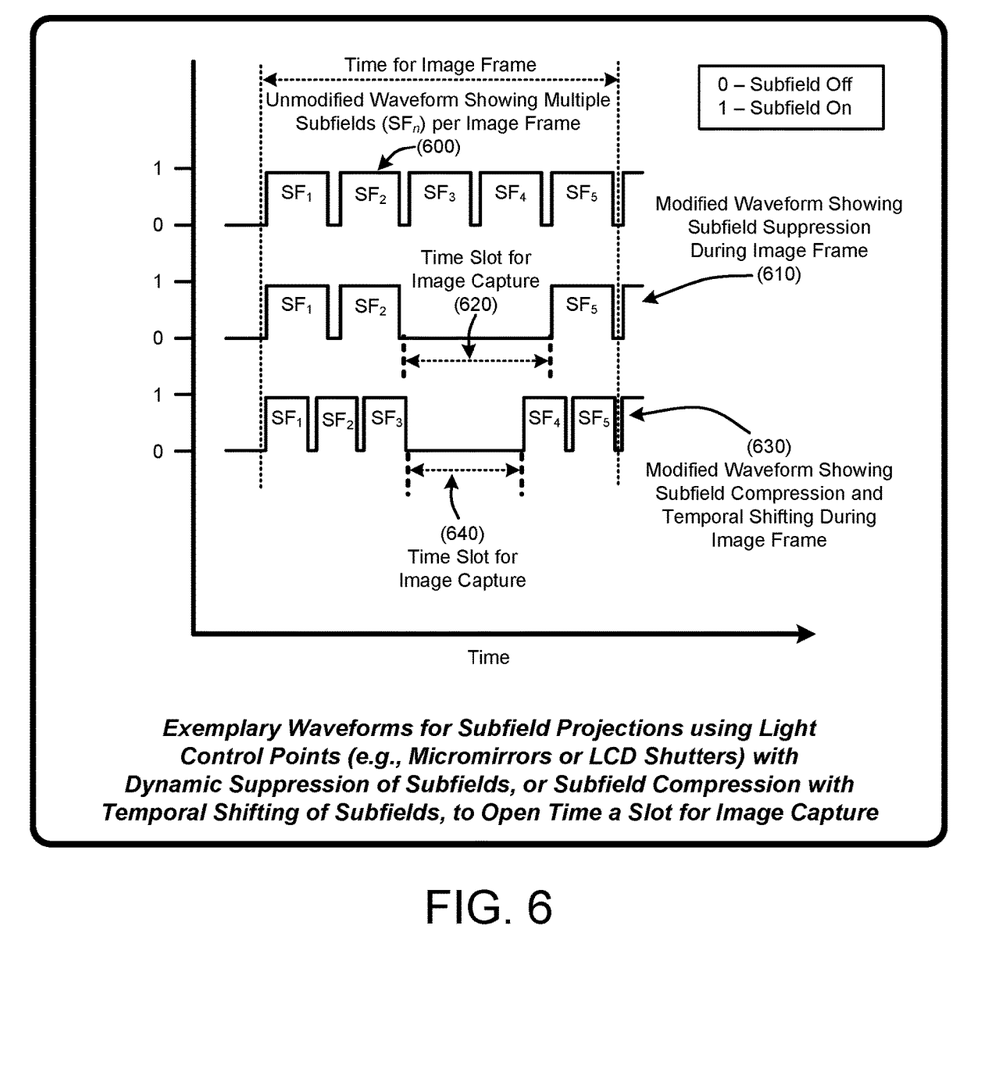
FIG. 6 illustrates exemplary waveforms corresponding to subfield projections using light control points (e.g., micro-mirrors or LCD shutters) with dynamic suppression of subfields, or subfield compression with temporal shifting of subfields, by the Concurrent Projector-Camera to open an intra-frame capture time slot for image capture, as described herein.

In particular, FIG. 6 illustrates an exemplary unmodified waveform 600 showing multiple subfields ($SF_n$) during which the light control point of the DLP projector is projecting during the time for each image frame. As noted above, in various embodiments, the Concurrent Projector-Camera suppresses or blanks one or more of the subfields, as illustrated by the modified waveform 610 that shows suppression or blanking of subfields $SF_3$ and $SF_4$, relative to the unmodified waveform 600. In the time provided by the blanked subfields, the Concurrent Projector-Camera opens an intra-frame time slot 620 for image capture. Note that while this example shows five subfields for each image frame and the suppression of two subfields, these numbers are provided only for purposes of illustration, and there may be more or fewer subfields in each frame, and more or fewer of those subfields can be suppressed or blanked by the Concurrent Projector-Camera to create the intra-frame time slot for image capture.

FIG. 6 also illustrates the aforementioned embodiment wherein subfields are both temporally compressed and temporally shifted to open the intra-frame time slot. In particular FIG. 6 illustrates a modified waveform 630 wherein each of the five subfields have been compressed by approximately 30% in time, while being shifted either forward or backwards in time to open an intra-frame time slot 640 between compressed subfields $SF_3$ and $SF_4$.

Note that the use of subfield compression in combination with subfield temporal shifting provides a finer granularity of control over the total time available for the intra-frame capture time slot than simply suppressing or blanking one or more subfields within an image frame. Consequently, such embodiments provide a corresponding finer granularity of control over the perceived projection brightness levels. Further, it should also be noted that in various embodiments, one or more of the subfields can be compressed by different amounts than other of the subfields within an image frame to open the intra-frame time slot for image capture.

2.3.3 Exemplary Raster-Scan Type Projector-Based Implementations:

In general, both raster-scan and rolling-shutter based projectors operate by projecting sequential portion of an image frame. In the case of raster scans, images are projected one pixel at a time in a sequence that scans (or projects) pixels across rows (or columns) of the projection area in a sequence fast enough to create a single image frame in human visual perception. In the case of rolling shutter based projectors, complete lines or bands of the image are projected in a sequence fast enough to create a single image frame in human visual perception. In other words, these types of projectors interweave projected pixels, lines or image bands to composite the overall image frame at a rate that is fast enough that human vision perceives the frame to be projected all at once rather than being built up over time. With these types of projectors, various embodiments of the Concurrent Projector-Camera are adapted to synchronize the image capture capabilities of the camera with the raster-scan or rolling shutter-based projections of the shutter such that the camera captures sub-bands or regions of the projection area during intra-frame times when the projector is projecting on other regions of the projection area. These captured sub-bands or regions are then composited in real-time to create a captured image frame of the projection area that is not corrupted by the projection.

2.4 Additional Embodiments and Considerations:

As noted above, the Concurrent Projector-Camera includes at a minimum an image projector and a camera, as well as the capability to dynamically modify projector on-states to open intra-frame time slots for image capture within the time for each image frame. However, beyond these minimum features, a number of additional advantageous capabilities are integrated into various embodiments of the Concurrent Projector-Camera, as described below. Further, it should be understood that while some amount of computing capabilities can be integrated into various embodiments of the Concurrent Projector-Camera, as illustrated by FIG. 2, the Concurrent Projector-Camera can be coupled or connected to a "host device" having sufficient computational resources to perform complex image and projection related computations in near real-time, as well as providing a mechanism for directing and controlling various features and capabilities of the Concurrent Projector-Camera. Consequently, for purposes of explanation, it should be understood that the various embodiments described below may be operational either with or without a "host device," depending upon the computational resources integrated into the Concurrent Projector-Camera, or into the individual cameras or projectors of the Concurrent Projector-Camera. However, connection to a "host device" will not generally be discussed further in the following paragraphs.

2.4.1 Super-Resolution and HDR Enhancements for the Camera:

In general, as is well known to those skilled in the art, cameras can be adapted, by using associated computational image processing, to produce images having significantly higher resolution or higher dynamic range than are available by simply capturing a single image.

For example, in the case of camera "super-resolution" type operations, image resolution can be enhanced by first imparting a small known or random jitter (i.e., small lateral camera motions in the x,y axes). Then, by capturing multiple images of the same region having small offsets caused by the jitter, those images can be recombined using various known super-resolution techniques to produce a composite image having a higher effective resolution than any of the contributing images.

Consequently, in various embodiments, the Concurrent Projector-Camera makes advantageous use of such techniques by opening multiple intra-frame capture time slots within the time for each image frame while imparting a jitter to the camera, thereby capturing multiple slightly offset images of the projection area that are uncorrupted by the projection. Real-time computational processing of those offset images is then performed by the Concurrent Projector-Camera to produce a super-resolution image of the overall projection area covered by the camera of the Concurrent Projector-Camera. Note that the construction of super-resolution images is known to those skilled in the art, and will not be discussed in detail herein. The contribution of the Concurrent Projector-Camera in such embodiments is the capability to dynamically control the projector on-off states to open multiple intra-frame capture time slots during the frame projection time during which one or more uncorrupted images can be captured.

Similarly, in the case of creating HDR images, the Concurrent Projector-Camera again opens multiple intra-frame capture time slots within the time for each image frame, while capturing an image during each such time slot. Further, these images are either captured at differing illumination levels or using a series of different image capture times (effectively controlling the amount of light captured by the camera) to provide a series of images that are then used to construct an HDR image using real-time computational processing of those images. Note that the construction of HDR images is known to those skilled in the art, and will not be discussed in detail herein. The contribution of the Concurrent Projector-Camera in such embodiments is the capability to dynamically control the projector on-off states to open multiple intra-frame capture time slots during the frame projection time during which one or more uncorrupted images can be captured.

2.4.2 Scene Illumination During Capture Time Slot:

As noted above, the Concurrent Projector-Camera opens time slots during which no projection is corrupting the projection area so that the camera portion of the Concurrent Projector-Camera can capture images for use in enabling a variety of shared workspace scenarios. However, rather than preventing any projection during the intra-frame capture time slots opened by the Concurrent Projector-Camera, in various embodiments, the Concurrent Projector-Camera further controls the projector to emit a desired amount of white light (or any desired lighting color of which the projector is capable) during each intra-frame capture time slot. These embodiments serve to better illuminate the projection area for the camera component of the Concurrent Projector-Camera.

This concept can also be adapted to rolling-shutter type projection systems. In particular instead of blacking the portion of the projection area not receiving a projection, the intra-frame capture time slots opened by the Concurrent Projector-Camera allows white light to shine on those areas while the camera of the Concurrent Projector-Camera captures an image of those areas. In other words, instead of the typical sub-band and black-band projection of rolling-shutter type projectors, these types of projectors are adapted project a white band in place of the black band, thereby illuminating portions of the projection area not currently receiving a sub-band of the projection.

Note that similar scene lighting effects (visible or not) are provided for various cameras or purposes by including dedicated lights or illumination sources of any desired color or frequency from IR through terahertz frequency ranges in the Concurrent Projector-Camera. These illumination sources are then synchronized to illuminate the projection area for the camera or cameras during each intra-frame capture time slot opened by the Concurrent Projector-Camera.

Further, different color lights (e.g., separate red, green and blue light sources, etc.) can be placed in offset positions within the Concurrent Projector-Camera to illuminate the scene from offset angles using different color lighting. Such embodiments enable a variety of photometric stereo based techniques. For example, as is well known to those skilled in the art, photometric stereo is a technique in computer vision for estimating the surface normals of objects in scene by observing those objects under different lighting conditions. The use of multiple color lights illuminating the scene from offset positions allows a single image to be captured with the different colors of that image then being processed separately to enable any desired photometric stereo based techniques. Similar effects can be achieved by using white lights positioned at offset locations to individually illuminate the scene to capture multiple images corresponding to each separate light source. However, such embodiments require more intra-frame time to be opened for capturing multiple images, thereby decreasing brightness levels of the projection, as discussed above.

Examples of photometric stereo based techniques include, but are not limited to, normal map generation, depth map generation, 3D rendering of imaged objects, recovery of the shape and reflectance properties of objects, 3D surface texture analysis, etc. As is well known to those skilled in the art, these and other photometric stereo based techniques have a wide variety of uses that need not be described in detail herein.

2.4.4 Depth Maps and Stereo Image Capture:

In various embodiments, a depth sensor (e.g., a depth sensor such as the sensor included in Kinect™ type devices), is included in the Concurrent Projector-Camera as an ancillary device for capturing or obtaining depth maps of 3D objects in the projection area. These depth maps are then used for a variety of purposes, such as, for example, to generate projections matching the 3D object that are then projected onto the 3D objects in the projection area by the projector. While devices such as the Kinect™ use structured light patterns to produce depth maps, devices based on other techniques may also be integrated into the Concurrent Projector-Camera for such purposes. Examples of such devices include, but are not limited to, laser scanning techniques, stereo or multi-camera setups, etc. In other words, any conventional process for constructing or deriving depth information from a scene can be integrated into various embodiments of the Concurrent Projector-Camera.

Note also that in various embodiments, the projector of the Concurrent Projector-Camera projects structured light patterns to illuminate the scene being captured by the camera or cameras of the Concurrent Projector-Camera during the intra-frame image capture time slot while the image of the scene is being captured. Again, as with devices such as the Kinect™, illumination of a scene using structured light allows the Concurrent Projector-Camera to capture sufficient information to construct or derive depth maps of 3D objects in the projection area. Interestingly, by projecting a negative or opposite of the structured light pattern (i.e., pixels illuminated in the original pattern are dark in the negative pattern and vice versa) quickly enough during the image capture time slot following image capture, those patterns will blend or cancel in the human visual perception such that human observers will not see either pattern being projected onto the scene.

Another type of camera that can be integrated into the Concurrent Projector-Camera is known as a "time of flight" (TOF) camera. As is well known to those skilled in the art, a time-of-flight camera or "TOF camera" is a camera system that creates distance data with help of the time-of-flight (TOF) principle. The principle is similar to that of LIDAR scanners with the difference being that the entire scene is captured with each laser or light pulse rather than being scanned with a moving laser. Typical TOF cameras cover ranges of a few meters up to about several kilometers depending upon the detector material being used. While the lateral resolution of TOF cameras is generally low compared to standard 2D video cameras, they are generally capable of capturing very large numbers of images (on the order of about 100 images per second or more). Such high frame rates enable a wide variety of applications to be provided by the Concurrent Projector-Camera, including scene motion analysis, 3D depth map construction, etc. As TOF cameras are well known to those skilled in the art, they will not be discussed in further detail herein.

As noted above, multiple cameras can be integrated into the Concurrent Projector-Camera for a variety of purposes. For example, by integrating multiple cameras into the Concurrent Projector-Camera at offset positions, the Concurrent Projector-Camera can capture concurrent images of the projection area from multiple offset viewpoints during each intra-frame image capture time slot. Therefore, given such images, depth maps or stereo images (i.e., 3D images) of 3D objects in the projection area can also be constructed or captured using conventional techniques. Consequently, a Concurrent Projector-Camera at one site can capture a stereo image of that site that is then projected as a stereo or 3D projection at another site (using conventional stereo or 3D projection techniques that may be integrated into the Concurrent Projector-Camera.

Another advantageous use of multiple cameras within the Concurrent Projector-Camera is that the scene can be captured from multiple viewpoints to create one or more 3D projections that can then be projected by 3D projectors within Concurrent Projector-Camera at other sites. Such embodiments allow uses, such as, for example, each person around a table at a first site to view a projection from a corresponding viewpoint around a table comprising the scene being captured by the Concurrent Projector-Camera at a second site. Similarly, a person at the second site could move around that table to view the scene of the first site from the multiple positions enabled by the 3D projection derived from the first site.

It should also be understood that when multiple cameras are used to construct various embodiments of the Concurrent Projector-Camera, there is no requirement that the different cameras have the same capabilities. For example, the Concurrent Projector-Camera can be designed with matching stereo cameras to capture 3D images in the visible spectrum while also including both an IR camera to capture or extract IR images or information from the scene as well as a TOF camera. In other words, any desired camera types or combinations can be combined to construct various embodiments of the Concurrent Projector-Camera.

2.4.5 IR Light Source Integration:

As is well known to those skilled in the art, infra-red (IR) light sources are not visible to the unaided human eye. Consequently, an IR light source can be included in the Concurrent Projector-Camera as an ancillary device for illuminating the projection area so that an IR camera can capture images of that area, even during projection times. So long as the IR camera is not also sensitive to visible light from the projector, IR images can be obtained in this manner and used for any desired purpose.

2.4.6 Polarized Light Source Integration:

In various embodiments of the Concurrent Projector-Camera, either or both the projector and any or all of the cameras or light sources of the Concurrent Projector-Camera are polarized. Further, in related embodiments, polarization angles of any of the projector, camera, or light sources can be manually or automatically adjusted and/or matched. Note that the various techniques for adjusting polarization angles are well known to those skilled in the art, and will not be described herein 2.4.7 Implementation within Small Form Factors:

Advantageously, when using small projectors (e.g., pico-projectors) in combination with relatively small cameras, the Concurrent Projector-Camera can be implemented within a small form factor about the size and configuration of a small desktop lamp. In fact, such a form factor can include optional additional lighting that allows the Concurrent Projector-Camera to function as a lamp when not being used for other purposes such as providing scene illumination for the camera.

For example, desktop lamps come in many configurations that can either be set onto a desktop surface to provide illumination of that surface, or can be clamped or attached to an edge of a desktop surface or other nearby object or wall. The Concurrent Projector-Camera can also be implemented within other lighting-type fixtures or even attached or hung from a ceiling (in a recessed or pendant-light type format), either with or without optional including lighting capabilities to enable the functionality described above. Therefore, by implementing the Concurrent Projector-Camera within any of these types of form factors, the Concurrent Projector-Camera enables implementations such as projections onto a table surface (or any other surface or area) wherein multiple parties at remote locations can interact with that projection without causing "visual echo" in the projection provided to any of the separate locations.

2.4.8 Automated Motion Control and Positional Instrumentation:

As noted above, in various embodiments, separate Concurrent Projector-Cameras are operated from multiple sites to enable a wide variety of multi-site communications and interaction scenarios. Various interesting extensions to this general idea are enabled by integrating motorized robotic-arm type controls and positional sensors into the Concurrent Projector-Camera. For example, such controls and sensors enable movements of a Concurrent Projector-Camera at one site to be concurrently and precisely replicated at every other site. Thus, if a user at one site moves the Concurrent Projector-Camera to pan over or zoom into a particular area during operation, that motion will be replicated at each remote site, thereby allowing the user to effectively view and interact with different portions of the remote scene (or scenes) while concurrently allowing other users at the remote sites to concurrently view and interact that scene as the Concurrent Projector-Camera moves to provide a changing viewpoint.

Note that in various motion control embodiments, one Concurrent Projector-Camera at one of the sites may be designated as a "master" and the others as "slaves." Each slave then replicates the motions of the master. This may help avoid the possibility that two or more sites will attempt to move the Concurrent Projector-Camera at the same time, which could result in a disconnect between the scenes being projected at each site.

In addition, the positional sensors associated with Concurrent Projector-Camera allow the cameras and/or projector to be automatically and precisely positioned at all concurrent sites. This allows the Concurrent Projector-Camera to capture particular camera points of view (POV) and/or to precisely position the projector to project onto particular surfaces and/or objects.

Further, it should be understood that various embodiments of the Concurrent Projector-Camera include position detection capabilities without the motion control capabilities described above. In other words, in various embodiments, position detection techniques using conventional sensors (i.e., potentiometers, shaft encoders, etc.) are used to determine the precise position of the Concurrent Projector-Camera. Such embodiments are useful for a variety of purposes, such as, for example, computing the relative distance and angle of the projection surface to the camera and projectors of the Concurrent Projector-Camera for zooming, tilt correction, looking around 3D objects, etc.

Figure 7:
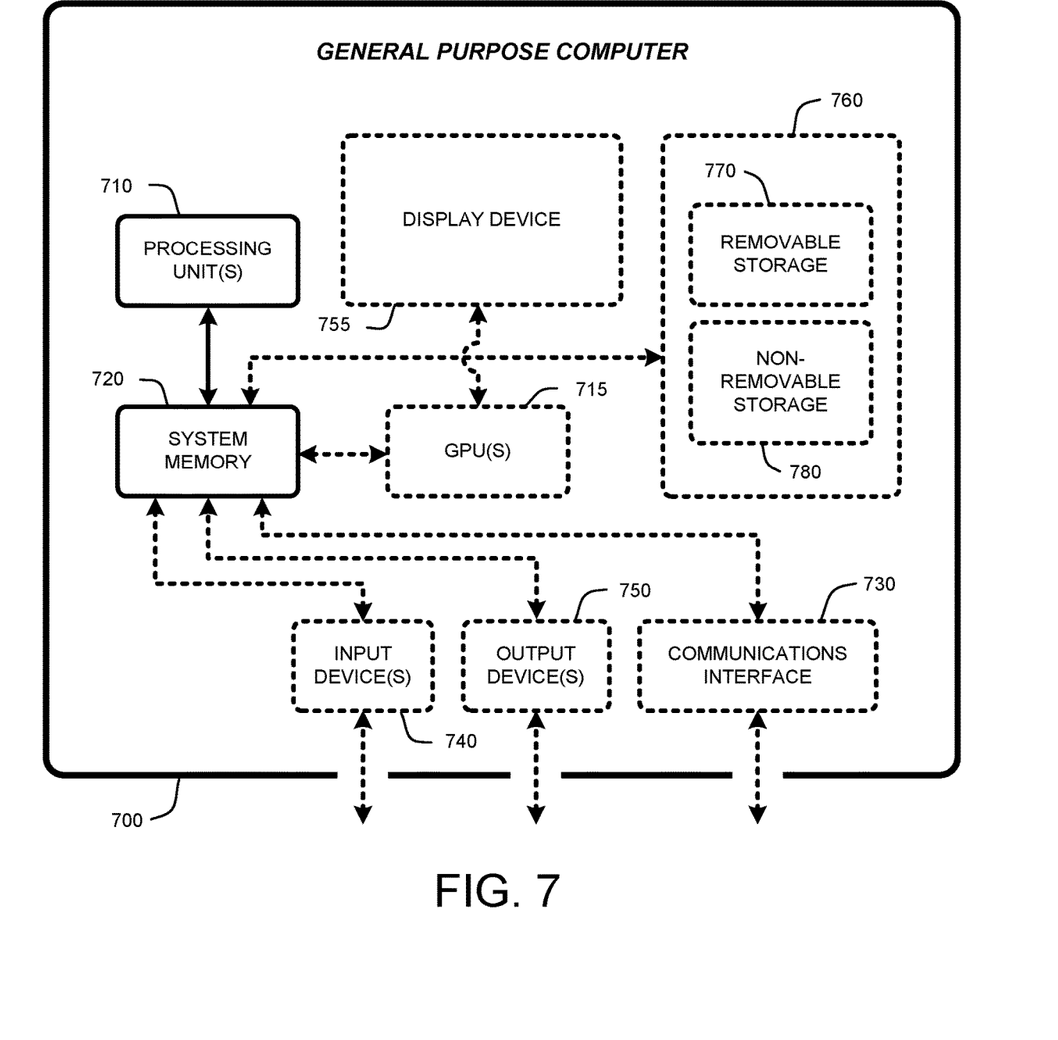
FIG. 7 illustrates is a general system diagram depicting a simplified general-purpose computing device having simplified computing and I/O capabilities for use in implementing various embodiments of the Concurrent Projector-Camera, as described herein.

3.0 Exemplary Operating Environments:

The Concurrent Projector-Camera described herein is operational with numerous types of general purpose or special purpose computing system environments or configurations, collectively referred to herein as a "computing device." FIG. 7 illustrates a simplified example of a general-purpose computer system with which various embodiments and elements of the Concurrent Projector-Camera, as described herein, may be implemented. It should be noted that any boxes that are represented by broken or dashed lines in FIG. 7 represent alternate embodiments of the simplified computing device, and that any or all of these alternate embodiments, as described below, may be used in combination with other alternate embodiments that are described throughout this document.

For example, FIG. 7 shows a general system diagram showing a simplified computing device 700. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, gaming platforms, etc.

To allow a computing device to interact with the Concurrent Projector-Camera, the device should have a sufficient computational capability and system memory to enable basic computational operations. In particular, as illustrated by FIG. 7, the computational capability is generally illustrated by one or more processing unit(s) 710, and may also include one or more GPUs 715, either or both in communication with system memory 720. Note that that the processing unit(s) 710 of the general computing device of may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 7 may also include other components, such as, for example, a communications interface 730. The simplified computing device of FIG. 7 may also include one or more conventional computer input devices 740 (e.g., pointing devices, keyboards, audio input devices, video input devices, haptic input devices, devices for receiving wired or wireless data transmissions, etc.). The simplified computing device of FIG. 7 may also include other optional components, such as, for example, one or more conventional computer output devices 750 (e.g., display device(s) 755, audio output devices, video output devices, devices for transmitting wired or wireless data transmissions, etc.). Note that typical communications interfaces 730, input devices 740, output devices 750, and storage devices 760 for general-purpose computers are well known to those skilled in the art, and will not be described in detail herein.

The simplified computing device of FIG. 7 may also include a variety of computer readable media. Computer readable media can be any available media that can be accessed by computer 700 via storage devices 760 and includes both volatile and nonvolatile media that is either removable 770 or non-removable 780, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Concurrent Projector-Camera described herein, or portions thereof, may be stored, received, transmitted, or read from any desired combination of computer or machine readable media or storage devices and communication media in the form of computer executable instructions or other data structures.

Finally, the Concurrent Projector-Camera described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a "cloud" of one or more devices (i.e., a "cloud computing" environment), that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Concurrent Projector-Camera has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Concurrent Projector-Camera. It is intended that the scope of the invention be limited not by this detailed description, but rather by the claims appended hereto.

What is claimed is:

1. A computer-implemented process comprising applying a general-purpose computing device to perform process actions for:
   continuously capturing image frames covering a first projection area;
   responsive to capturing of the image frames, performing an ongoing scene motion analysis including real-time motions of one or more moving 3D objects within the first projection area;
   further responsive to capturing of the image frames, generating one or more real-time depth maps of the first projection area, the depth maps further comprising one or more of the moving 3D objects and one or more 3D locations within the first projection area, each 3D location corresponding to a current position of one or more of the moving 3D objects;
   responsive to the ongoing scene motion analysis and generation of the real-time depth maps, matching one or more real-time projections to one or more of the moving 3D objects; and
   causing one or more projection devices to project frames of one or more of the matched projections onto corresponding moving 3D objects at a current 3D location within the first projection area for the corresponding moving 3D objects.

2. The computer-implemented process of claim 1 further comprising capturing the continuously captured image frames covering the first projection area during periods that avoid corruption of the captured image frames by the projection of any frame of any of the matched projections.

3. The computer-implemented process of claim 1 further comprising capturing a video covering the first projection area during periods that include the projection of frames of one or more of the matched projections.

4. The computer-implemented process of claim 3 further comprising projecting the captured video to a second projection area.

5. The computer-implemented process of claim 3 wherein the captured video is a 3D video.

6. The computer-implemented process of claim 5 further comprising projecting the captured 3D video to a third projection area.

7. The computer-implemented process of claim 1 further comprising causing one or more motorized control devices to automatically position one or more of the projection devices to project onto one or more of particular surfaces and particular objects within the first projection area.

8. The computer-implemented process of claim 1 further comprising projecting frames of one or more real objects into the first projection area.

9. The computer-implemented process of claim 1 further comprising projecting frames of one or more virtual objects into the first projection area.

10. The computer-implemented process of claim 1 further comprising transmitting audio to the first projection area via one or more audio output devices.

11. The computer-implemented process of claim 1 further comprising capturing audio within the first projection area via one or more audio input devices.

12. The computer-implemented process of claim 1 further comprising projecting at least one structured light pattern onto the first projection area.

13. A computer-implemented process comprising applying a general-purpose computing device to perform process actions for:

continuously capturing image frames covering a first projection area including one or more moving 3D objects;

responsive to capturing of the image frames, generating one or more real-time depth maps of the first projection area, the depth maps further comprising one or more of the moving 3D objects and one or more 3D locations within the first projection area, each 3D location corresponding to a current position of one or more of the moving 3D objects;

responsive to the generation of the real-time depth maps, matching one or more real-time projections to one or more of the moving 3D objects; and causing one or more projection devices to project one or more of the matched projections onto corresponding moving 3D objects at a current 3D location within the first projection area for the corresponding moving 3D objects.

14. The computer-implemented process of claim 13 further comprising:

capturing a video covering the first projection area during periods that include the projection of frames of one or more of the matched projections; and projecting the captured video to a second projection area.

15. The computer-implemented process of claim 13 further comprising causing one or more motorized control devices to automatically position one or more of the projection devices to project onto one or more of particular surfaces and particular objects within the first projection area.

16. The computer-implemented process of claim 13 further comprising projecting frames of any combination of one or more real objects and one or more virtual objects into the first projection area.

17. The computer-implemented process of claim 13 further comprising projecting at least one structured light pattern onto the first projection area.

18. A system, comprising:

one or more image capture devices configured to continuously capture image frames covering a first 3D projection area including a plurality of moving 3D objects;

one or more computing devices configured to generate one or more real-time depth maps from the continuously captured image frames, the depth maps further comprising one or more of the moving 3D objects and one or more 3D locations within the first 3D projection area, each 3D location corresponding to a current position of one or more of the moving 3D objects;

one or more of the computing devices further configured to match one or more real-time projections from the real-time depth maps to one or more of the moving 3D objects; and one or more projection devices configured to project one or more of the matched projections onto corresponding moving 3D objects at a current 3D location within the first 3D projection area for the corresponding moving 3D objects.

19. The system of claim 18 wherein one or more of the projection devices are further configured project frames of any combination of one or more real objects and one or more virtual objects into the first 3D projection area.

20. The system of claim 18 further comprising one or more motorized control devices configured to automatically position any combination of the image capture devices and the projection devices.

* * * * *